Jan. 19, 1971  W. G. SANTY  3,555,916
POSITIONING DEVICE
Filed Jan. 15, 1969  2 Sheets-Sheet 1

INVENTOR.
WILLIAM G. SANTY
BY
John A. Jordan
ATTORNEY

United States Patent Office 3,555,916
Patented Jan. 19, 1971

3,555,916
POSITIONING DEVICE
William G. Santy, New Canaan, Conn., assignor to International Business Machines Corporation, Armonk, N.Y., a corporation of New York
Filed Jan. 15, 1969, Ser. No. 791,313
Int. Cl. F16h 27/02
U.S. Cl. 74—89.15                                    18 Claims

ABSTRACT OF THE DISCLOSURE

A micropositioning device is provided which permits X direction and rotational positioning of a positioning plate through utilization of a pair of wedge shaped cams. The pair of cams are capable of effecting first and second forces at spaced points on the positioning plate. With both forces present rotational positioning is obtained while with one force present translational positioning is obtained. Movement in the Y direction is effected through micrometer spindle movement.

BACKGROUND OF THE INVENTION

The present invention relates to a positioning device and more particularly to a micropositioning device for providing subminature rotational and translational positioning of a workpiece in a single plane.

Advances in the field of microcircuit technology have created a need for precise and fine positioning devices which allow accurate positioning and orientation of the workpiece, with respect to the worktool, in order to perform incident operation with a high degree of precision. For example, in present masking and etching operations, it is desirable to have minuscule movement of the circuit chip or wafer, both rotationally and translationally, within 1 part in 10 millionths.

Not only does the need exist for an accurate and precise positioning device but also for a device which is simple and rugged in design, requiring little time and cost for manufacturing and allowing simple manipulation by an operator, thus minimizing error caused by inadvertence.

SUMMARY OF THE INVENTION

In accordance with the present invention a simple and accurate micropositioning device is provided which permits X direction and rotational positioning through utilization of a pair of wedge shaped cams, individually operated. Movement of the cams in opposite directions effects translational movement of the workpiece in the X direction while movement of the cams in the same direction effects rotational movement of the workpiece in the X-Y plane. Movement in the Y direction is effected through simple rectilinear movement caused by micrometer type operation.

It is therefore an object of this invention to provide an improved micropositioning device.

It is a further object of this invention to provide a simple micropositioning device which positions both translationally and rotationally in the X-Y plane.

It is another object of this invention to provide a micropositioning device which exhibits a high degree of accuracy and precision.

It is yet another object of this invention to provide an accurate micropositioning device which is simple in design and low in manufacturing cost.

It is still further another object of this invention to provide an accurate and simple micropositioning device which is not susceptible to inadvertent error in positioning caused by the operator.

The foregoing and other objects, features and advantages of the invention will be apparent from the following more particular description of a preferred embodiment of the invention, as illustrated in the accompanying drawings.

DESCRIPTION OF THE INVENTION

Figure 1:
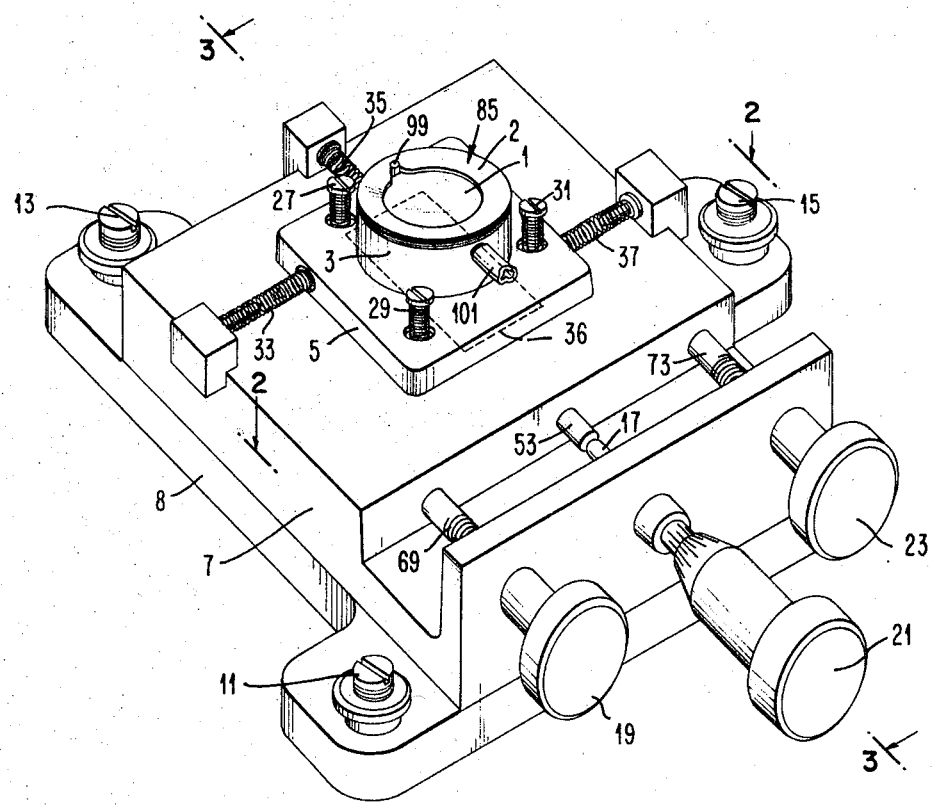
FIG. 1 is a perspective view of the preferred embodiment of the micropositioning arrangement in accordance with the present invention.

The positioning device as shown in FIG. 1 acts to locate workpiece 1 with respect to an incident worktool, depending upon the operation required. Workpiece 1 may be any of a variety of semiconductor chips or any other type workpiece. Annular wall 3, affixed to plate 5, is the chamber wall of a piston-chamber arrangement used to hold workpiece 1. Positioning plate 5 makes contact with and is free to move with respect to the top surface of guide plate 7. Guide plate 7 is mounted on base plate 8.

As shown in FIG. 1 leveling nuts 11, 13 and 15 of base plate 8 are employed to accommodate initial leveling of the positioning device. Appropriate operation of positioning knobs 19, 21 and 23 will effect both translational and rotational movement of plate 5 over the X-Y plane of the top surface of plate 7.

Spring loaded shoulder bolts 27, 29 and 31 in FIG. 1 act to hold plate 5 onto plate 7. The diameter of holes in plate 5, accommodating bolts 27, 29 and 31, are sufficiently larger than the bolts to allow the required freedom of movement to position plate 5. For example, shoulder bolts 27, 29 and 31 may be fit to allow plate 5 movement of the order of one millimeter. In this respect it is clear that the contact surfaces between plates 5 and 7 should be smooth to allow ease of movement. Equally clear is the fact that one of the contact surfaces may be serrated to reduce friction between the surface.

Figure 2:
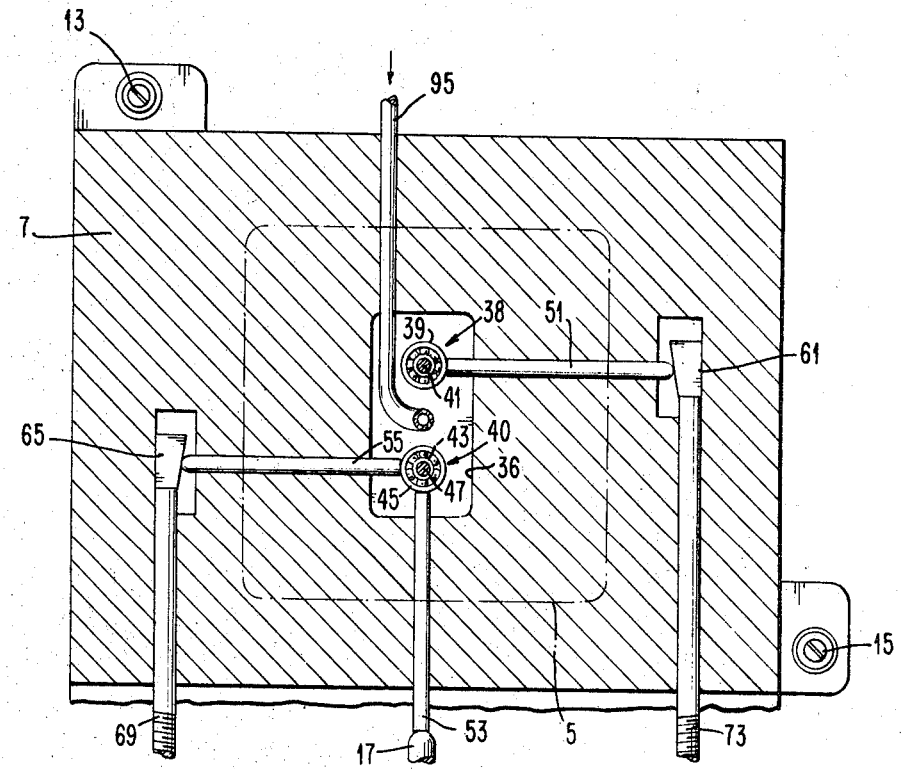
FIG. 2 is a cross-sectional top view along line 2—2 of FIG. 1.
Figure 3:
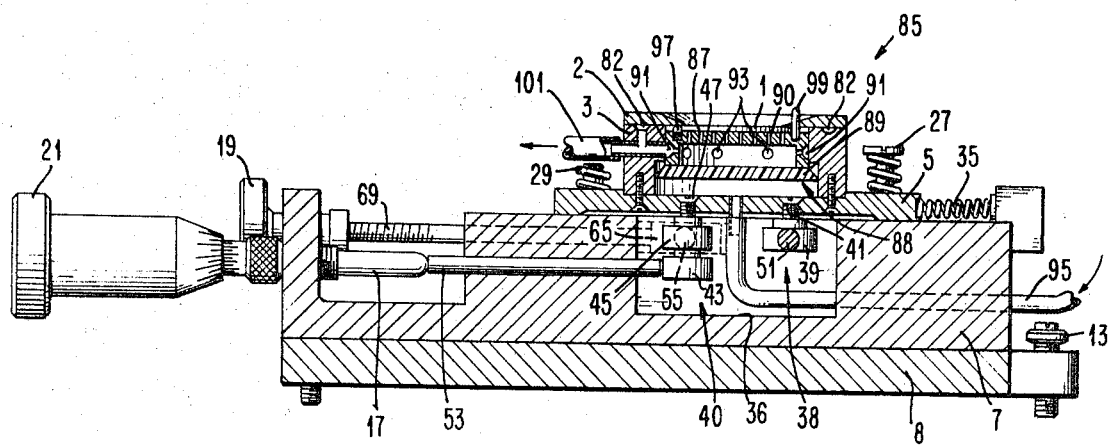
FIG. 3 is a cross-sectional side view along line 3—3 of FIG. 1.

As will be evident from the ensuing more detailed discussion of FIGS. 2 and 3 coil springs 33, 35 and 37 act to provide lateral forces upon plate 5 to insure proper movement in response to operation of knobs 19, 21 and 23. As will be explained in more detail hereinafter operation of knobs 19, 21 and 23 effects movement, within cavity 36, of a pair of ball bearing operated positioning shafts coupled to the underside of plate 5.

The top view cross-sectional arrangement of FIG. 2, taken along line 2—2 of FIG. 1, shows the assembly used to impart positioning movement to positioning plate 5.

As shown in FIG. 2, cavity 36 in plate 7 accommodates movement of a pair of positioning shafts 38 and 40, coupled to the undersurface of plate 5. Positioning shaft 38 comprises a ball bearing assembly 39 held by a bolt 41. As shown in FIG. 3, bolt 41, set in plate 5, is screwed into the inner race of ball bearing 39 to rigidly hold same perpendicularly to the undersurface of plate 5. Likewise, positioning shaft 40 comprises a ball bearing assembly pair 43–45 and bolt 47. As shown in FIG. 3, bolt 47 is screwed into the inner race of a pair of ball bearings 43 and 45.

With reference to FIG. 2, it can be seen that follower rods 51, 53 and 55 make contact with the outer race of ball bearings 39, 43 and 45, respectively. Follower rods 51, 53 and 55 are positioned in holes bored in plate 7 and are free to move laterally. It is clear that follower rods 51 and 55 are positioned to apply forces to plate 5, via positioning shafts 38 and 40, which are off-line from one another.

Positioning movement in the X-direction is imparted to follower rods 51 and 55 through the action of wedge shaped cams 61 and 65, respectively, and movement in the Y-direction is imparted through the action of follower rod 53. In this respect it should be noted that each of the follower rods 51, 53 and 55 are free at each of their ends and merely make contact with the various bearings and cams.

The manner in which X, Y and rotational movement of positioning plate 5 is effected will become more evident with the following description of the operation of knobs 19, 21 and 23, shown in FIG. 1.

As can be seen with reference to FIG. 2 shaft 69 contains left-hand threads and shaft 73 contains right-hand threads. It is evident, however, that alternative thread arrangements could be used. In accordance with the arrangement shown, however, counterclockwise rotation of knob 19, as shown in FIG. 1, will cause threaded shaft 69 in FIG. 2 to move outwardly while counterclockwise rotation of knob 23, as shown in FIG. 1, will cause threaded shaft 73 in FIG. 2 to move inwardly. It can be seen that this counterclockwise rotation of both knobs 19 and 23 causes follower rods 51 and 55 in FIG. 2 to move to the right. In this respect rod 55 is forced to the right by the increasing width of wedge shaped cam 65 while rod 51 is allowed to move to the right because of the decreasing width of wedge shaped cam 61. Positioning shaft 38 moves rod 51 to the right in response to both the movement of rod 55 to the right and the action of coil spring 33, shown in FIG. 1. The combined action of this spring and rod insures translational positioning of the workpiece as the knobs are turned. It should be noted that each of the springs 33, 35 and 37, shown in FIG. 1, are positioned to apply a force to plate 5 which is on-line with the force that may be applied by the respective follower rods 51, 53 and 55.

It is evident that with identically pitched threaded shafts 69 and 73 and identically tapered cams 61 and 65 translational X-direction movement of the workpiece can be effected by simultaneous movement of knobs 19 and 23 at the same rate. However, to obtain merely an ultimately nontranslated positioning of the workpiece it is only required that the knobs be operated in a manner such that follower rods have been moved through equal distances.

It is clear that clockwise rotation of both knobs 19 and 23 effects X-direction movement to the left with spring 37 in FIG. 1 and rod 51 in FIG. 2 acting in the same manner as spring 33 and rod 55 operated in the description of the X-direction movement to the right. It should also be clear that movement of knobs 19 and 23 in FIG. 1 in opposition causes rotational movement of positioning plate 5. Specifically, counterclockwise movement of knob 19 and clockwise movement of knob 23 will effect counterclockwise rotation of positiong plate 5. Likewise clockwise movement of knob 19 and counterclockwise movement of knob 23 will effect clockwise rotation of plate 5 .

As is evident in FIG. 2 operation of the micrometer 21 in FIG. 1 effects movement of follower rod 53 to provide Y-direction movement. It should be noted that coil spring 35 in FIG. 1 acts upon the center of positioning plate 5 to provide a return force to move plate 5 outwardly when the micrometer is operated to withdraw its spindle 17.

It is evident from the above discussion that any number of rotational and translational positions for workpiece 1 may be precisely obtained within the positioning bounds of the novel micro-positioning device of the present invention. The utilization of cams and drive screws provides a high degree of accuracy and precision. For example, accuracy within ten millionths may be obtained with properly machined parts. In addition the use of screws and knobs have the advantage of minimizing error of positioning due to inadvertence.

With reference to FIG. 3 there is shown a cross-sectional side view, taken along line 3—3 in FIG. 1, of the novel positioning device of the present invention. FIG. 3 includes some of the details of the workpiece holding piston-chamber arrangement mounted on positioning plate 5 of the preferred embodiment.

As shown in FIG. 3, workpiece holding piston-chamber arrangement 85 includes a piston 88, chamber enclosure wall 3 and surface locator ring 2. Surface locator ring 2 is held in place by the effect of the vacuum created in channel 82 in annular enclosure wall 3. Locator ring 2 is used to hold workpiece 1 in place.

Piston arrangement 88, within chamber wall 3, comprises an upper disk-shaped piston plate 87 upon which workpiece 1 rests and a lower disk-shaped piston plate 89 upon which air pressure is exerted. The lower plate 89, made of a nonabrading resilient or elastomeric material such as rubber, fits snugly against the inner surface of chamber wall 3 to provide a sealed ring type arrangement. Upper plate 87 contains an array of vacuum holes 90. Connecting the upper piston plate 87 with the lower piston plate 89 is a cylindrical piston wall containing an annular vacuum channel 91 concentrically imbedded therein. Spaced around vacuum channel 91 are holes 93 connecting the region inside piston 88 with the channel.

With no pressure applied to input pressure line 95, piston 88 is in a downward position resting on the surface of plate 5, as shown in FIG. 3. At this time locator ring 2 may be removed to allow insertion of workpiece 1. Initial positioning and guidance for workpiece 1 is provided by three equally spaced pins around the outer periphery of the upper surface of plate 87. Shown in FIG. 3 are two of the pins, 97 and 99. All pins but pin 99 are spring loaded.

With workpiece 1 initially positioned between the guide pins, surface locator ring 2 in place and pressure applied to input pressure line 95, piston 88 rises so that the outer periphery of the upper surface of workpiece 1 makes contact with the under surface of ring 2 so as to be firmly held in position thereby. The vacuum simultaneously applied to input vacuum line 101 holds ring 2 in place and obviously must effect a greater force on ring 2 than the force effected on piston 88 by the pressure at 95.

In addition to being held by surface locator ring 2, workpiece 1 is also held by the force effected by the vacuum created inside piston 88 when it reaches its up position in response to applied pressure. From FIG. 3 it can be seen that when piston 88 is up the vacuum applied to vacuum input line 101 is also communicated through channel 91 and holes 93 to the inside portion of piston 88. The vacuum inside piston 88 in turn communicates, via the holes in upper plate 87, with workpiece 1 to effect an additional holding force therefor. Thus, with workpiece 1 initially positioned and locked in place final positioning may be obtained.

It can thus be seen that in accordance with the preferred embodiment, workpiece 1 is firmly held by the action of piston-chamber arrangement 85, mounted on positioning plate 5. However, it is evident that other means may be used to mount and hold the workpiece.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a positioning device including a positioning plate for supporting an object to be positioned:

first and second cam means coupled to spaced points on said positioning plate so that movement of said cam means acts to apply forces to said plate to effect planar movement thereof; and control means coupled to each of said first and second cam means to move same in the same direction to provide rotational movement of said plate and to move same in opposite directions to provide translational movement of said plate.

2. The device as set forth in claim 1 wherein said cam means are wedge shaped.

3. The device as set forth in claim 1 wherein said control means includes first and second rotatable control means each including threaded shaft means and threaded knob means, one end of each of said threaded shaft means respectively coupled to said first and second cam means so that rotation of said threaded knob means on said threaded shaft means provides said movement of said cam means.

4. A positioning device for translational and rotational positioning of a workpiece comprising:
   a position plate for supporting the workpiece to be positioned;
   mounting means to mount said plate to provide rotational and translational freedom of movement of said plate in the plane of said plate; and
   control means including means for selectively applying first and second opposing forces, parallel to said plane, to respective first and second spaced points on said plate to provide translational positioning of said plate when one of said first and second forces is present and to provide rotational positioning of said plate when both of said first and second forces are present.

5. The device as set forth in claim 4 wherein means are provided to apply a force to said plate, parallel to said plane, in a direction orthogonal to said first and second forces to provide positioning orthogonal to said translational positioning.

6. A micropositioning device for providing subminiature positioning of a workpiece comprising:
   a positioning plate having an upper surface for supporting said workpiece;
   mounting means to mount said plate so as to allow rotational and translational movement of said plate in the plane of said surface; and
   positioning means including first and second similarly shaped cam means each coupled by coupling means to different points on said plate so that movement of said cams in the same direction effects rotational movement of said plate and movement of said cams in opposite directions effects translational movement of said plate.

7. The device as set forth in claim 6 wherein said positioning means includes screw control means coupled to each of said first and second cam means so that rotation of said screw control means effects said movement of said cam means.

8. The device as set forth in claim 7 wherein said screw control means are oppositely threaded.

9. The device as set forth in claim 8 including micrometer means coupled by coupling means to one of said different points on said plate so that operation of said micrometer means effects movement of said plate orthogonal to said translational movement.

10. The device as set forth in claim 9 wherein each of said first and second cam means are wedge shaped and said coupling means are follower rods.

11. A micropositioning device comprising:
    a positioning plate including means for mounting a workpiece on the top surface of said plate;
    first and second positioning shaft means coupled, at spaced points, to the under surface of said plate, each of said positioning shaft means including a shaft with ball bearing assembly means mounted thereon;
    first and second similarly shaped cam means coupled by respective coupling means to the respective first and second positioning shaft means to make contact with said ball bearing assembly means; and
    control means coupled to said cam means to move said cam means in the same direction to provide rotational movement of said plate and in the opposite direction to provide translational movement of said plate.

12. The device as set forth in claim 11 including micrometer means coupled to one of said first and second positioning shaft means to provide movement of said plate orthogonal to said translational movement.

13. A micropositioning device for subminiature rotational and translational positioning of a workpiece comprising:
    positioning plate means for mounting said workpiece;
    support means for mounting said plate means so as to allow rotational and translational movement of said plate means in the plane of said plate means;
    positioning means to position said plate means including means to selectively apply a first force, parallel with said plane, at a point on said plate means and means to selectively apply a second force, parallel with said plane and in opposition to said first force, at a second point on said plate means off-line with the line on said first force;
    first and second spring means connected to said plate means so as to be respectively positioned on-line with and to provide forces to said plate in opposition to said first and said second force; and
    control means to control said positioning means so that both said first and second forces are applied to said plate means to provide rotational positioning and one of said first and second forces are applied to said plate means to provide translational positioning.

14. The device as set forth in claim 13 wherein said means to selectively apply a first force and said means to selectively apply a second force each include a cam actuated follower rod.

15. The device as set forth in claim 14 wherein said means to selectively apply a first force and said means to selectively apply a second force each further include positioning shaft means connected to said plate with bearing means interposed between said shaft means and said follower rod.

16. The device as set forth in claim 15 further including means to apply a force to one of said positioning shaft means, orthogonal to said first and second forces, to provide positioning orthogonal to said translational positioning.

17. A micropositioning device for providing sub-miniature rotational and translational positioning of a workpiece in a plane comprising:
    positioning plate means having first and second surfaces, said first surface having mounted thereon means to hold said workpiece to be positioned and said second surface having mounted thereon and protruding therefrom in spaced relationship a pair of positioning shaft means;
    guide plate means including a guide plate having an upper surface to support said second surface of said positioning plate means and cavity means to accommodate said positioning shaft means mounted on said second surface so that said positioning plate means is free to move translationally and rotationally in the plane of said upper surface of said guide plate means;
    first follower rod means laterally supported by said guide plate means for applying a first force to one of said pair of positioning shaft means;
    second follower rod means laterally supported by said guide plate means for applying a second force, in opposition to but off-line from said first force, to the other of said pair of positioning shaft means;
    first and second cam means for respectively imparting the respective said first force and said second force to the respective said first follower rod means and said second follower rod means;
    first spring means coupled between said positioning plate means and said guide plate means for applying a force to said positioning plate means in opposition to said first force;

second spring means coupled between said positioning plate means and said guide plate means for applying a force to said positioning plate means in opposition to said second force; and means for operating said first and second cam means so that when one of said first and second forces is imparted translational positioning of said positioning plate means is effected and when both said first and second forces are imparted rotational positioning of said positioning plate means is effected.

18. The device as set forth in claim 17 including third follower rod means laterally supported by said guide plate means for applying a force to one of said pair of positioning shaft means to provide positioning of said positioning plate means orthogonal to said translational positioning.

References Cited

UNITED STATES PATENTS

| | | | |
|---|---|---|---|
| 2,097,209 | 10/1937 | Cooper et al. | 33—184.5 |
| 3,078,731 | 2/1963 | Cator | 74—89 |

SAMUEL S. MATTHEWS, Primary Examiner

U.S. Cl. X.R.

33—174